May 3, 1966  R. P. BENZINGER  3,249,100
IGNITION DISTRIBUTOR MECHANISM
Filed April 19, 1965  3 Sheets-Sheet 1

INVENTOR.
Robert P. Benzinger
BY
*Donald P. Selwicki*
His Attorney

INVENTOR.
Robert P. Benzinger
His Attorney

May 3, 1966  R. P. BENZINGER  3,249,100
IGNITION DISTRIBUTOR MECHANISM
Filed April 19, 1965  3 Sheets-Sheet 3

INVENTOR.
Robert P. Benzinger
BY
Donald P. Selveski
His Attorney

United States Patent Office 3,249,100
Patented May 3, 1966

3,249,100
IGNITION DISTRIBUTOR MECHANISM
Robert P. Benzinger, Lathrup Village, Mich., assignor to General Motors Corporation, Detroit, Mich., a corporation of Delaware
Filed Apr. 19, 1965, Ser. No. 449,180
3 Claims. (Cl. 123—117)

This in a continuation-in-part of application Serial No. 299,043, filed July 31, 1963, for an ignition distributor mechanism.

This invention relates to a spark advance control system for an internal combustion engine distributor and more particularly to a type of spark advance control means that is suitable for use on an engine having an exhaust driven supercharger.

On internal combustion engines of the type having an exhaust driven supercharger, a problem of detonation appears during certain speed ranges. These speed ranges depend on the particular efficiency rating of the supercharger being used. However, it can generally be said that, during speeds under 2000 r.p.m., detonation will not present a serious problem. The main reason for this is that exhaust driven superchargers are not operating near their maximum efficiency at lower engine speeds.

It is common in spark advance controls to provide a vacuum advance at lower engine speeds which is supplemented by and eventually entirely replaced by centrifugal means. In supercharged engines, as the supercharger increases in efficiency, the vacuum in an engine decreases rather rapidly and eventually disappears as a pressurized condition in the induction system is brought about. At these speeds, the centrifugal advance mechanism is incapable of providing an advance in the spark and the vacuum advance is effectively inoperative.

Therefore, it is an object of the present invention to provide a spark retarding means which is designed to operate in a range of engine speeds where detonation becomes a problem.

It is another object of the present invention to provide a single means which will retard the spark during a period of detonation and later advance the spark as the engine speed increases above a detonation range.

It is still a further object of the present invention to provide a spark control means which is adaptable for use with a distributor of common design.

It is yet a further object of this invention to provide a spark retard-advance means that has the same number of parts as a standard spark advance control mechanism.

It is also a further object of this invention to provide a spark advance-retard-advance curve that will provide a proper spark timing during any range of operation of an engine that has an exhaust driven supercharger.

Further objects and advantages of the present invention will be apparent from the following description, reference being had to the accompanying drawings wherein preferred embodiments of the present invention are clearly shown.

Figure 1:
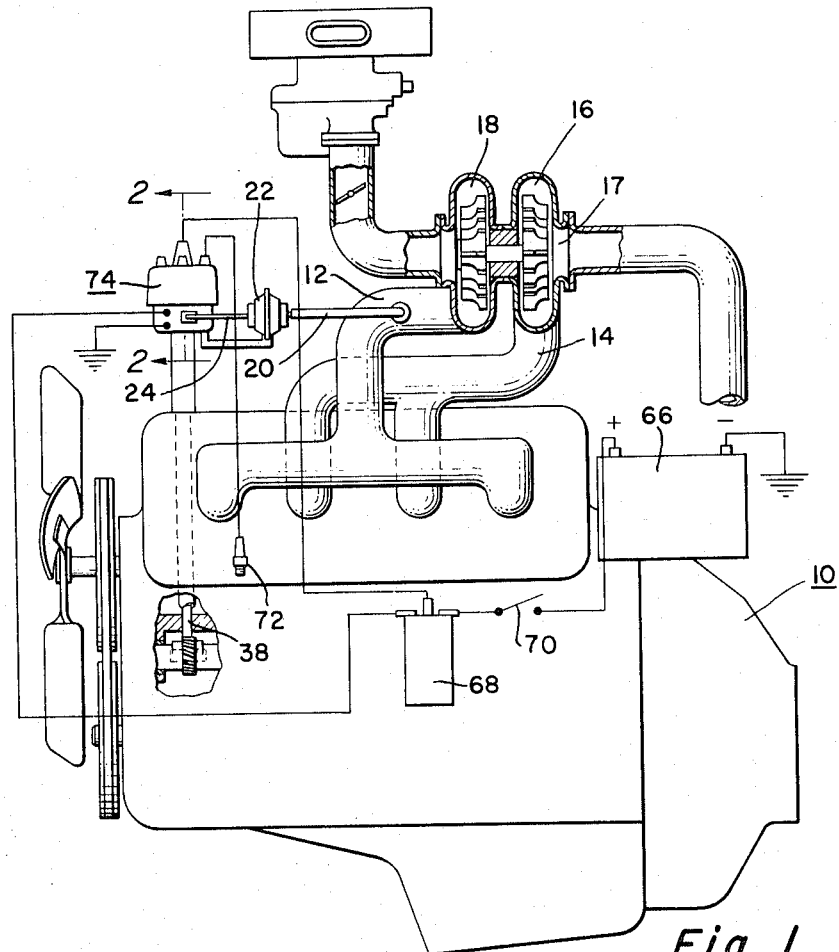
FIGURE 1 is a diagrammatic illustration of an internal combustion engine having an exhaust driven supercharger shown with parts broken away and with the appropriate electrical system components also shown with parts broken away.

Referring now to FIGURE 1, an internal combustion engine 10 is shown with an intake manifold 12 and an exhaust manifold 14. A supercharger 16 has a driving portion 17 shown in a passage leading from the exhaust manifold 14, said supercharger having a driven portion 18 disposed in the intake manifold 12. A vacuum line 20 is tapped into the intake manifold 12 on one end and is connected to a vacuum control unit 22 at another end. A mechanical link 24 is made responsive to the diaphragm in the vacuum control unit 22, it being of typical design, and is connected on another end to a vacuum advance plate 26 shown in FIGURE 5.

Figure 5:
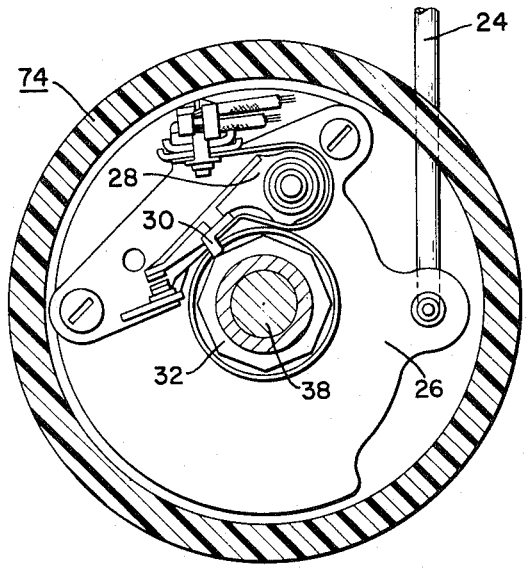
FIGURE 5 is a sectional view taken along line 5—5 of FIGURE 2 illustrating the typical breaker point and cam arrangement for the distributor.

Referring now to FIGURE 5, the vacuum control plate 26 has mounted thereon a set of breaker points 28 having a rubbing block 30 responsive to a cam 32.

Figure 2:
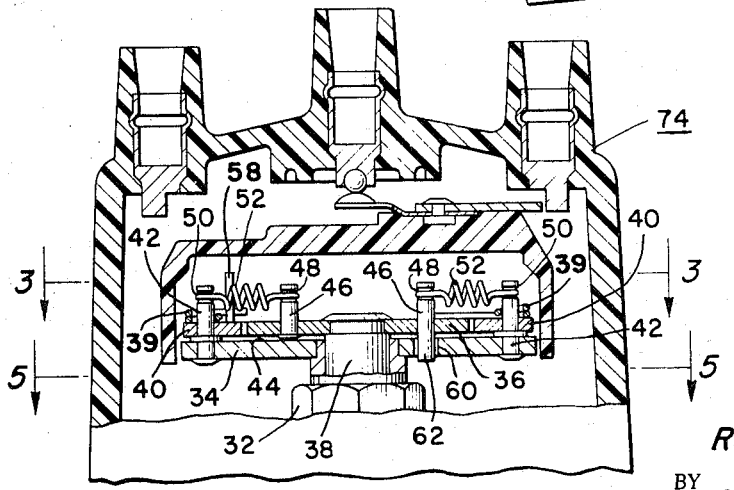
FIGURE 2 is a partial sectional view taken along line 2—2 of the distributor of FIGURE 1.

As best seen in FIGURE 2, a breaker cam 32 is carried by a control plate 34. A drive cam 36 is attached to a distributor drive shaft 38 in any well-known manner to prevent relative rotation therebetween. Therefore, movement of plate 34 relative to cam 36 results in a retardation or advancing of the spark. A pair of weights 40 are pivoted respectively on pivot pins 42 which are firmly affixed to a surface 44 of the control plate 34. A spring retaining pin 46 having a groove 48 is attached on either end of the drive cam 36. A groove 50 in the pivot pin 42 cooperates with a retaining loop of a spring 52. Another retaining loop of the spring 52 cooperates with the groove 48 of the retaining pin 46 to engage the spring 52 on the opposite end. In this manner, the control plate 34 through the pivot pins is held in biased engagement with the drive cam 36 through the retaining pins. The manner of connection of the spring 52 is also clearly illustrated in FIGURES 3 and 4.

Figure 4:
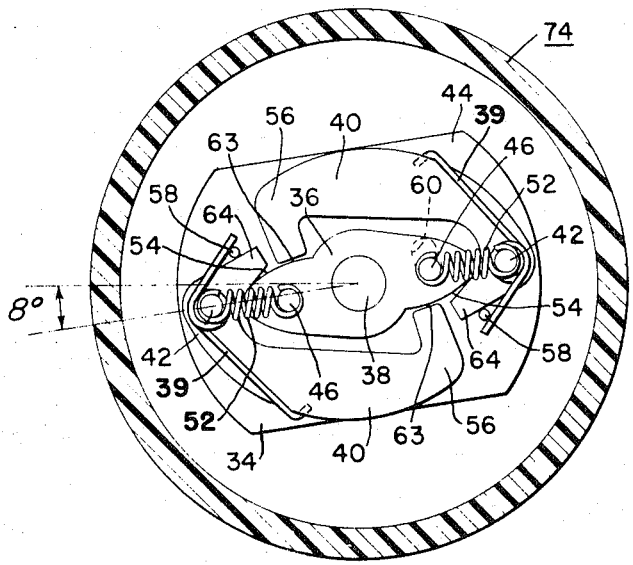
FIGURE 4 is a sectional view taken along line 3—3 of FIGURE 2 illustrating the spark control mechanism in a retarded position in accordance with this invention.

Referring now to FIGURE 4, the series of weights 40 have portions 64 bearing on an edge of the drive cam 36 to drive plate 34 into an (advanced) position when the portions 56 of the series of weights 40 swing away from the drive cam 36 during rotation of the distributor drive shaft 38 and its attached drive cam 36 due to centrifugal force generated in the weights as they swing around the pivot pins 42. This situation will occur at a higher engine speed than illustrated by the control plate position in FIGURE 4. A series of weight stop pins 58 are provided on the control plate 34 against which the series of weights 40 rest during low speed operation of the engine.

Figure 3:
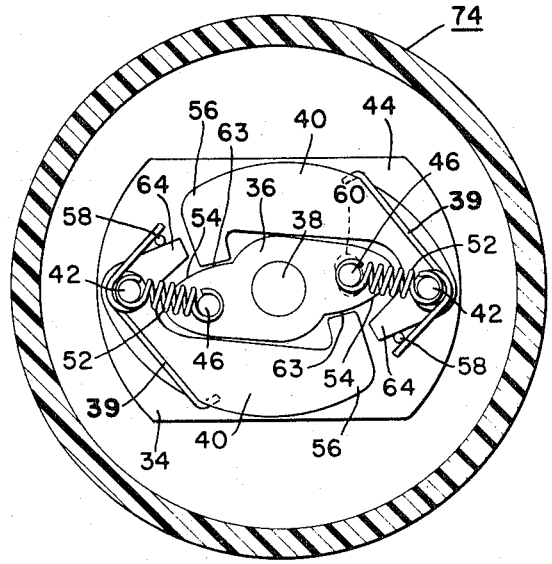
FIGURE 3 is a sectional view taken along line 3—3 of FIGURE 2 showing the spark control in a no-advance or indexed position.

A slot 60 in the control plate 34, as shown by the dotted lines in FIGURE 3, cooperates with a range pin 62 firmly embedded on the underside of the drive cam 36 to provide a limit for the relative movement between the control plate 34 and the drive cam 36. This pin and slot arrangement has the function of limiting the amount of retard and advance that the spark advance control systems of a distributor of the type described has in operation.

As the engine is operated in the lower speed ranges, for example, 500 to 1500 r.p.m., the efficiency of the supercharger 16 will not have increased to the point where the driven portion 18 has pressurized the intake manifold 12. During these speed ranges, the appropriate amount of spark advance is generated by the vacuum control unit 22. As the engine speed increases to a medium range speed, for example 1500 to 2500 r.p.m., the efficiency of the supercharger increases to the point where the intake manifold is not under vacuum any longer but is in the early stages of pressurization. This state of pressurization disables the vacuum control unit and eliminates the spark advance that had been bulit into the distributor during periods of lower r.p.m. operation. Due to the increased output of the supercharger, this retardation of the spark from its advanced position is desirable now that the engine has its intake manifold pressurized. Depending on the particular design of the supercharger used, there is a speed range between 2000 r.p.m. and 3000 r.p.m. at road load where no vacuum advance is had, and the intake manifold is becoming increasingly pressurized and the standard centrifugal advance mechanisms are not yet effective. In this range of operation there occurs a period when detonation becomes inevitable due to the relatively advanced state of the spark and the increasingly pressurized fuel-air mixture. This invention provides a means of further retarding the spark during this critical detonation range and thereby eliminating the destructive effect of detonation on the engine.

Referring now to FIGURE 3 which is the indexed position, equilibrium is established between first spring means 39 acting through weight means 40 to rotate plate 34 carrying weight means 40 against the force of second spring means 52. While in this position, no advance nor retard is had with the cam means 32 so related to switching means or breaker point means 28. The equilibrium is upset during an engine speed condition above the point where the vacuum advance is no longer effective and weight means 40 swing outwardly against the bias of springs 39 and extension 64 is drawn into cam portion 54 by springs 52. This results in a movement to the configuration of FIGURE 4 which is an ignition retard position. Further engine r.p.m. increase results extension 64 driving plate 34 relative to cam 36 which results in opposite rotation of plate 34 from that previously described to an ignition advance position. This is the normal centrifugal advance portion of the cycle.

Thus, to clearly establish the sequence of operation, the following is proffered. The ignition system, as illustrated in FIGURE 1, is of the conventional type. A battery 66, supplemented by a generator not shown, supplies electrical voltage to the primary winding of a coil 68 through an ignition switch 70. The output or secondary side of the coil 68 supplies a much higher voltage to a series of spark plugs, one shown, 72 through a distributor 74. This ignition system is a conventional type and is interrelated with the induction system as shown in FIGURE 1 through the vacuum line 20 tapped off the induction manifold 12 and through the spark plug 72 reposing in the combustion chamber of the engine, not shown.

The internal combustion engine is started and is idled at approximately 500 r.p.m. At this stage of the operation, the exhaust gases turning the supercharger are not yet sufficient to pressurize the intake manifold. During the range of operation from approximately 500 r.p.m. to 1500 r.p.m., a normal vacuum initiated spark advance sequence is maintained. Even as high as 1500 r.p.m., using the design of a typical exhaust driven supercharger, the efficiency of the supercharger has not advanced to a point where the intake manifold is positively pressurized. When acceleration of the engine is continued above approximately 1500 r.p.m. to approximately 2500 r.p.m., the engine intake manifold begins to decrease in vacuum and eventually becomes positively pressured. This positive pressurization disables the vacuum control unit which is normally tapped into the intake manifold and effectively cancels all of the spark advance having its origin with the vacuum unit. This normally occurs at the higher end of the 1500 to 2500 r.p.m. range. Contemporaneous with the cancelling of the spark advance, the peak efficiency point of the exhaust driven supercharger is normally reached. The effect of this is the maximum compaction of the molecules of the fuel-air mixture in the intake manifold and, hence, the combustion chamber. This highly compacted mass has a tendency to pre-ignite using the normal spark advance pattern and causes the condition known as detonation. A remedy for detonation is to burn the combustible mixture slower. It is obviously impractical to change the physical composition of the fuel in the combustible mixture so therefore the only practical solution is to delay the firing of the spark plug, that is, to retard the spark.

The utility of this invention becomes readily apparent in that the arrangement of parts as disclosed herein provides an automatic and sure method of retarding the spark at precisely the point in the speed ranges where detonation occurs. More specifically, this effect is attained by moving the breaker cam in a counterclockwise direction as viewed in FIGURE 4 relative to FIGURE 3, the retarding direction, by means of spring tension drawing the control plate 34 more nearly in alignment with the drive cam 36. The amount of retardation for a specific design can be easily controlled by the length of the range slot and pin arrangement as well as by the force of springs 39.

As the speed of the engine increases past approximately 2500 r.p.m., the detonation propensity of the engine declines and it again becomes necessary to advance the spark from this extremely retarded position. This invention likewise provides this feature in that the weights begin to swing out toward the perimeter of the distributor and, in so doing, through the generation of centrifugal force, exert pressure on the drive cam 36 levering the control plate, to which the pivot pins are attached, ahead of the drive cam. Thus, the advancing sequence of the spark is again initiated and continued in an advancing manner until the peak speed capabilities of the engine are reached.

Figure 6:
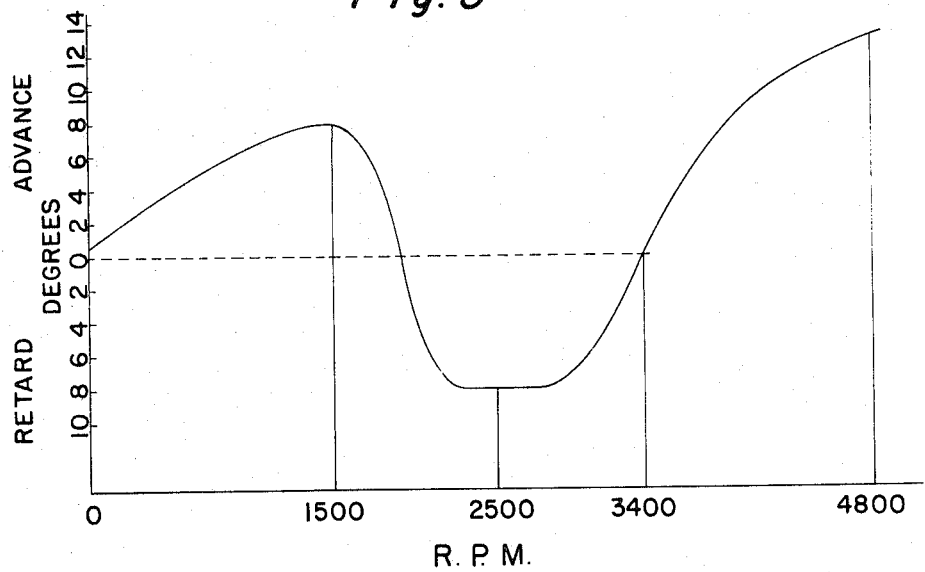
FIGURE 6 is an illustration of a typical spark advance-retard curve generated by the use of this invention.

In FIGURE 6 is seen a graphic illustration of an approximate spark advance and retard curve that is generated through the various speed ranges of a typical supercharged internal combustion engine. It is clearly understood that the particular spark advance and retard curve shown demonstrates only the directions of movement of the curve and is not meant to restrict the operation of this invention to the particular r.p.m. ranges listed on said curve.

Therefore, it now becomes possible to mount an exhaust driven supercharger of a common design on any production type internal combustion engine and be able to maintain an acceptable spark advance-retard sequence consonant with the requirements of said combination.

While the embodiments of the present invention, as herein disclosed, constitute preferred forms, it is to be understood that other forms might be adopted.

What is claimed is as follows:

1. In a timing device for an internal combusion engine having an ignition switching means and switch operating cam means therefor, the improvement comprising; means for driving the cam means in timed relationship to said engine establishing an indexed position for the ignition switching means relative to the cam means; engine load responsive means for shifting the switching means relative to the cam means to establish an advanced ignition position during a part engine load condition, said engine load responsive means returning the switching means to an indexed position at a higher engine load condition; and engine speed responsive means for shifting said cam means relative to said switching means to a retarded ignition position during a first portion of a further increase in engine load and speed, said engine speed responsive means reversely shifting the cam means relative to the switching means during a second portion of an increase in engine speed and load through the indexed position to an advanced ignition position.

2. The improvement according to claim 1 wherein said indexed position represents the relative position of the cam means and the switching means wherein the ignition timing is neither advanced nor retarded.

3. The improvement according to claim 1 wherein said engine speed responsive means includes first and second spring means acting on a single element having several cam surfaces; and weight means having several surfaces acting against said several cam surfaces, said first spring means engaging said single element to drive said element against a cam surface to rotate said element in a first direction against the bias of said second spring means wherein an indexed position of the cam means relative to the switching means is maintained during a low engine speed, said first spring means overcome by a centrifugal force generated by said weight means during an increasing engine speed to make said second spring means dominant thereby moving the cam means relative to the switching means to an ignition retard position, said weight means overcoming the biasing force of both said first and second spring means during an increasing engine speed to lever the cam means relative to the switching means in an opposite direction to bring about an advanced ignition position.

References Cited by the Examiner

UNITED STATES PATENTS

| | | | |
|---|---|---|---|
| 2,217,364 | 10/1940 | Halford et al. | 123—117.1 |
| 2,391,525 | 12/1945 | Spengler | 64—25 |
| 2,393,344 | 1/1946 | Scott | 64—25 |
| 2,533,755 | 12/1950 | Bange | 64—25 |
| 2,549,748 | 4/1951 | Purdy | 64—25 |
| 2,549,750 | 4/1951 | Spengler | 64—25 |

MARK NEWMAN, *Primary Examiner.*

L. M. GOODRIDGE, *Assistant Examiner.*